G. C. SMITH.
AUTOMATIC CONTROLLER.
APPLICATION FILED DEC. 18, 1916.
1,276,279.
Patented Aug. 20, 1918.
4 SHEETS—SHEET 4.
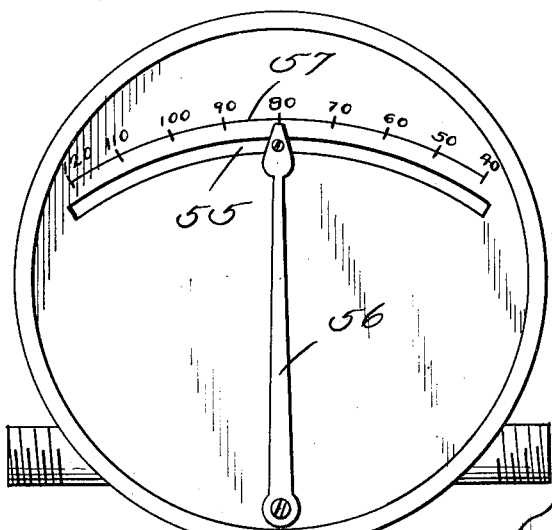
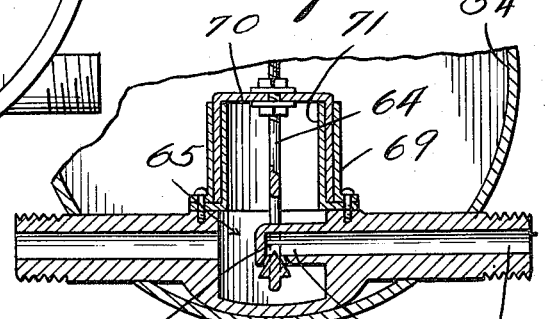
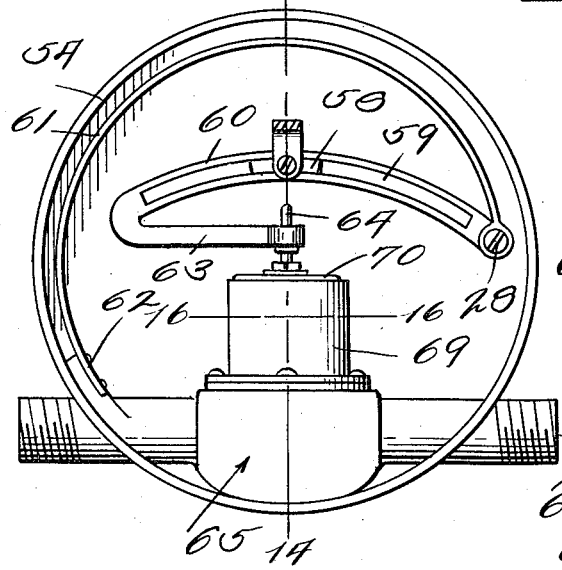
Inventor
G. C. Smith

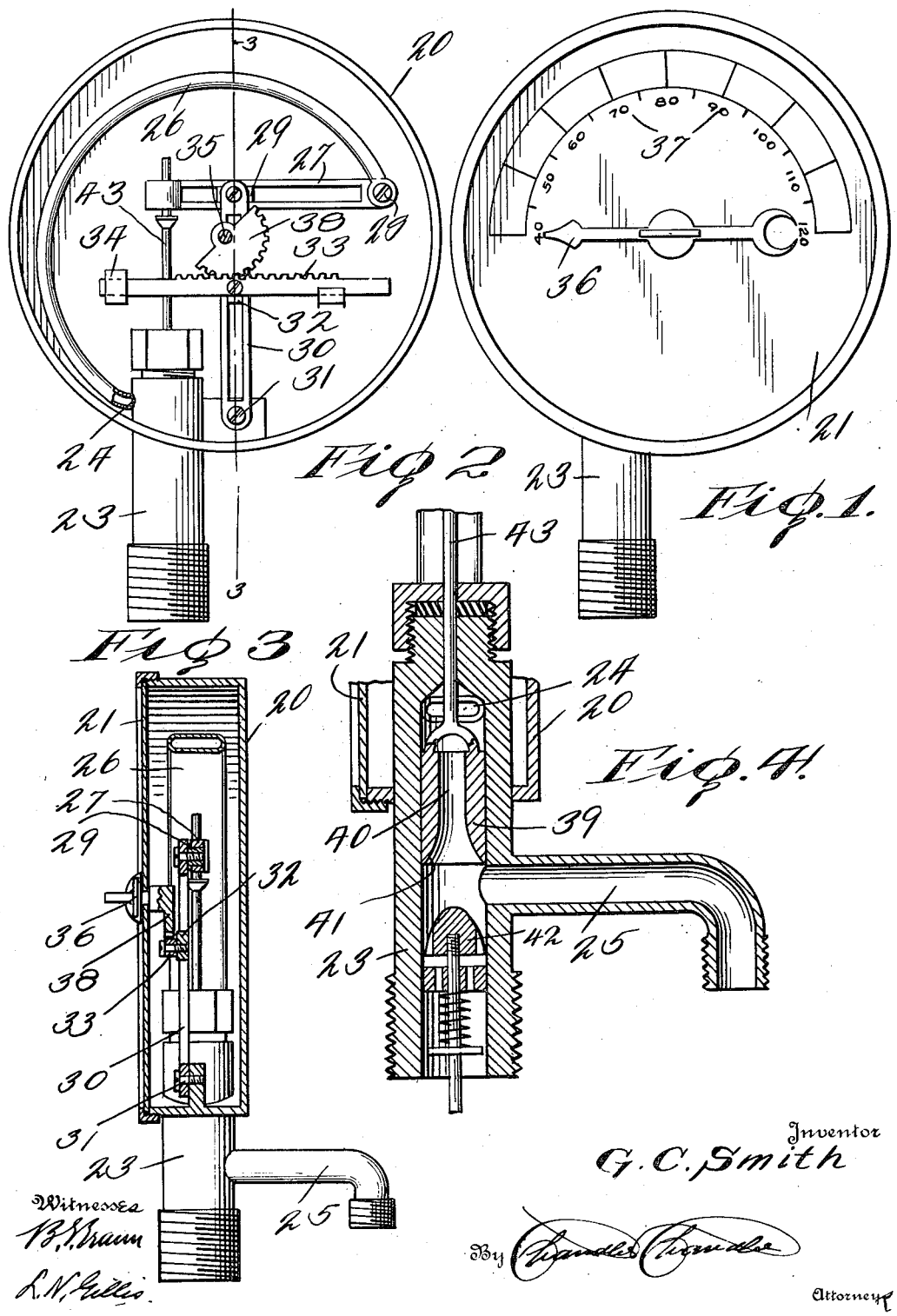

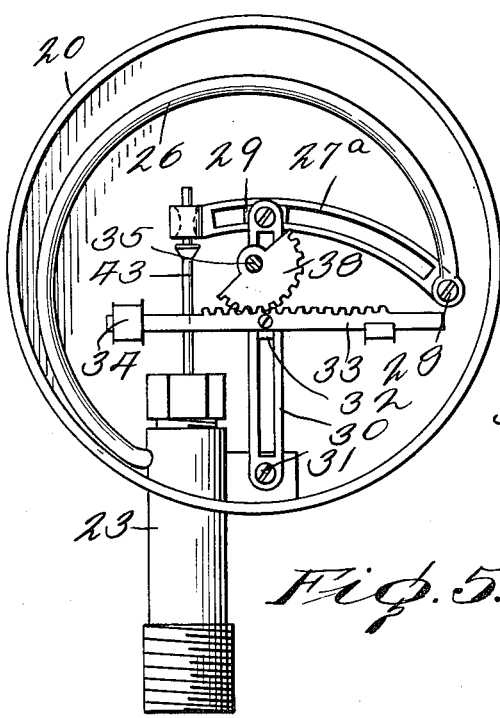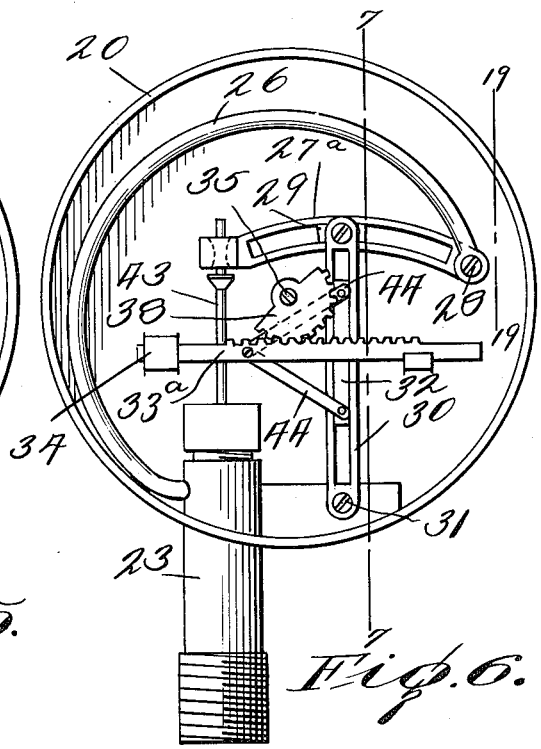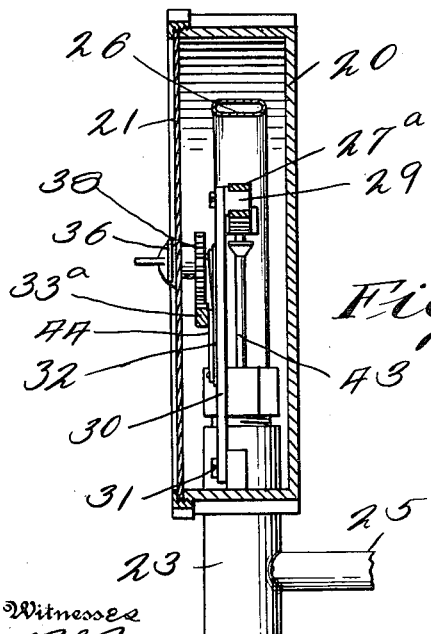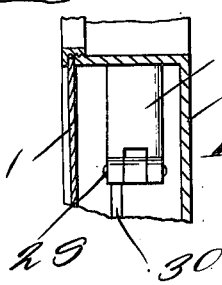

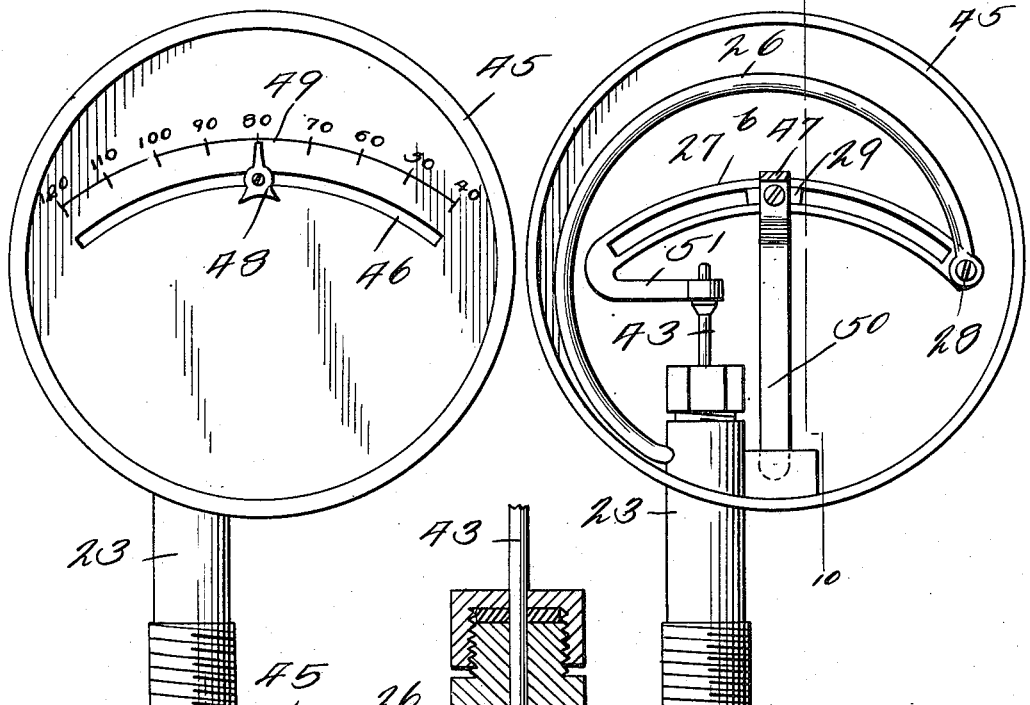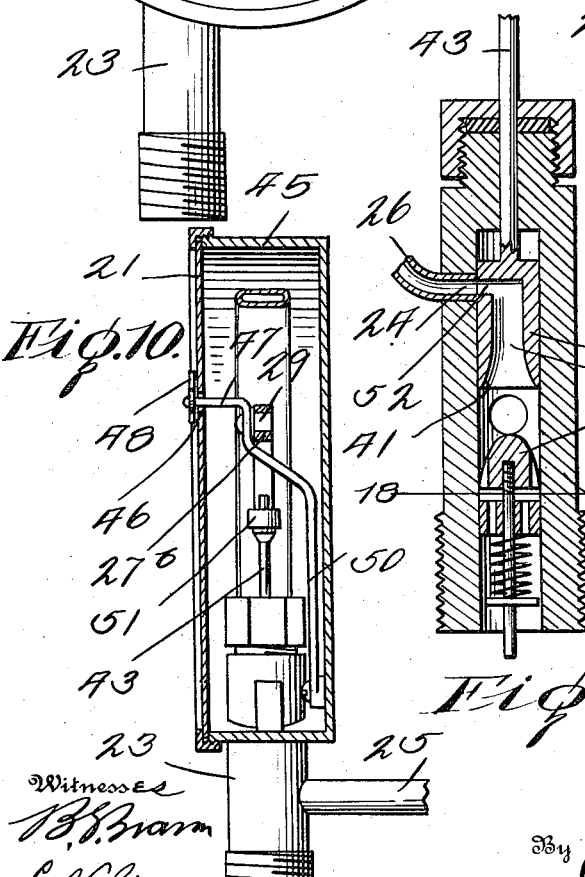

UNITED STATES PATENT OFFICE.

GIBSON C. SMITH, OF FREDERICK, MARYLAND.

AUTOMATIC CONTROLLER.

1,276,279.　　　　　Specification of Letters Patent.　　Patented Aug. 20, 1918.

Application filed December 18, 1916. Serial No. 137,641.

*To all whom it may concern:*

Be it known that I, GIBSON C. SMITH, a citizen of the United States, residing at Frederick, in the county of Frederick, State of Maryland, have invented certain new and useful Improvements in Automatic Controllers; and I do hereby declare the following to be a full, clear, and exact description of the invention, such as will enable others skilled in the art to which it appertains to make and use the same.

This invention relates to controlling devices and has special reference to an automatic controller arranged to cut off the supply of air to a pneumatic tire or the like when the pressure has reached a predetermined desired point, the cutting off being accomplished automatically and the device capable of being quickly set to cut off at any desired pressure.

One important object of the invention is to provide an improved and simplified automatic controller to be used in controlling the air supply to pneumatic tires.

A second important object of the invention is to provide an improved shifting fulcrum lever mechanism for use in connection with such a controller.

A third important object of the invention is to provide an improved combination of shifting fulcrum lever with a hollow spring in the form of a Bourdon tube for regulating the movement of the valve used to cut off the air supply when desired.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is a face view of one form of the device.

Fig. 2 is a view thereof with the face plate removed.

Fig. 3 is a section on the line 3—3 of Fig. 2.

Fig. 4 is an enlarged detail section through the valve in this form.

Fig. 5 is a view similar to Fig. 2 but showing a modified arrangement of a lever used herewith.

Fig. 6 is a view similar to Fig. 2 but showing a second modification of the lever and fulcrum arrangement of the device.

Fig. 7 is a section on the line 7—7 of Fig. 6.

Fig. 8 is a face view of a fourth modification of the device.

Fig. 9 is a view of the fourth modification with the face plate removed.

Fig. 10 is a section on the line 10—10 of Fig. 9.

Fig. 11 is an enlarged detail section of the valve used in the fourth modification.

Fig. 12 is a face view of a fifth modification.

Fig. 13 is a view of the fifth modification with the face plate removed.

Fig. 14 is a section on the line 14—14 of Fig. 13.

Fig. 15 is an enlarged detail section of the valve and expansion cup used in the fifth modification.

Fig. 16 is a section on the line 16—16 of Fig. 13.

Fig. 17 is a section through the tubular spring used with the first four modifications.

Fig. 18 is a section on the line 18—18 of Fig. 11.

Fig. 19 is a section on the line 19—19 of Fig. 6.

In the form of the invention shown in Figs. 1 to 4 there is provided a casing 20 having a dial face 21, and passed through the side of the casing is a pipe 23 having an outlet port 24 in its inner end portion within the casing, and having a second outlet port 25 exteriorly of the casing. The outer or inlet end of the pipe 23 is adapted for connection to an air reservoir or pump while the outlet 25 is adapted for connection to a tire valve of the ordinary sort. Within this casing is located a Bourdon tube 26 which has one end secured fixedly to the pipe 22 and communicates with the interior of said pipe through the outlet port 24. At 27 is a lever which is pivoted at one end to the remaining end of the Bourdon tube 26, the connection being indicated at 28. This lever is slotted through practically its entire length and slidably in this slot is a fulcrum block 29 which is carried by the upper end of the lever 30 pivoted fixedly in relation to the pipe 22 as at 31. The lever or arm 30 is also slotted and carries a block 32 whereto is pivoted a rack bar 33 working in a guide 34. Mounted centrally of the casing is a spindle 35 whereon is an indicator hand 36 traversing a scale 37. Fixed to the spindle 35 is a gear 38 which meshes with the rack bar 33.

Slidable within the pipe 22 is a valve 39 having an opening 40 extending longitudinally therethrough and provided also at the mouth of the opening 40 with a valve seat 41 which receives a spring-pressed valve 42 when the valve 39 is pressed down. The outlet 25 lies just above the valve 42 so that when the valve 39 is moved upward this outlet is exposed while, when the valve 39 is moved downward the outlet is closed. By reason of the passage 40 through the valve communication is had from the inlet end of the device to the Bourdon tube which varies in shape in the usual manner common to such devices according to the increase or decrease of the pressure.

In the operation of this form of the device the arm 36 is set at the required pressure and the device connected both to the pump or tank and the tire. Now, as the pressure is turned on from the tank the Bourdon tube will expand and the lever 27 will tilt and thus move the valve 39, being connected to said valve by a link or stem 43. As the pressure in the tire and consequently in the Bourdon tube approaches the predetermined desired pressure, the lever 27 moves to such position as to push down the valve 39 and close off the flow of air to the tire. It will be observed that by the shifting of the fulcrum 29, due to the moving of the lever or arm 36, the required pressure in the tire may be accurately adjusted.

In the form shown in Fig. 5 the parts are identically the same with the exception that the lever 27 is replaced by a lever 27ᵃ which is arcuate in form and in like manner the lever is provided with an arcuate slot throughout its extent.

In the form shown in Fig. 6 the arcuate lever is employed but in this instance the rack bar 33 is replaced by a solid rack bar 33ᵃ which is connected to the rock arm or lever 30 by means of links 44 pivoted to the rack bars 33ᵃ and to said arm or lever 30. Otherwise the construction is the same as in the first two forms.

In the form shown in Figs. 8, 9, 10 and 11 there is provided a casing 45 having an arcuate slot 46 therein through which projects the stem 47 of a pointer 48 traversing a scale 49. This stem 47 is directly connected to a lever 50 which corresponds to the lever or arm 30 in the previous form. Moreover the lever 27 is replaced by a lever 27ᵇ having a rebent arm 51 extending from its free end in the direction of its fulcrum and to this rebent arm is connected the stem 43.

In this form, moreover, it will be observed that the valve 39 is replaced by a valve 52 having a passage extending from the end adjacent the inlet of the device toward the outer end but terminating short thereof, the passage being provided with an outlet 52 which registers with the outlet port 24 in one position and is out of registry therewith in a second position.

It will be observed that in all of these forms the action is precisely similar to that described in detail in relation to the first form, that is to say, the pointer or gage arm is adjusted to the pressure desired in the tire and the air turned on so that when the pressure in the tire and the pressure in the Bourdon tube has attained the desired degree, the valve will have attained closing position.

In the form shown in Figs. 12 to 16 inclusive there is provided a casing 54 the front of which has an arcuate slot 55 therein. Pivoted on this front is a scale arm 56 working over a scale 57. Connected directly to the scale arm 56 is a fulcrum block 58 which works in an arcuate slot 59 formed in a lever 60. One end of this lever 60 is pivotally connected to a solid spring 61 the other end of which is connected to a fixed point in the casing as at 62. Extending from the free end of the lever 60 in the direction of its fulcrum is an arm 63 which is connected to the stem 64 of a valve 65 arranged to close the outlet 66 of a pipe 67 when in one position and to permit passage of air therethrough when in a second position. This pipe has the usual inlet 68.

Mounted on the pipe is an oval casing 69 within which fits an expansible rubber cup 70 which is held in position by means of an inner lining 71 so that it is clamped between the parts 71 and 69. The top of this rubber member is fixed to the stem 64 so that as the air pressure increases in the tire this top will be moved up and thus close off the valve 65.

It will be observed that in each of these instances there is provided a lever which coacts directly with a gauge arm through the medium of an adjustable fulcrum and that this lever controls the air valve of the pipe admitting air from the tank or pump to the tire.

It will also be observed that in the first four forms the spring used in connection with the device takes the form of a Bourdon tube while in all the forms a similarly shaped spring is employed in a similar relation.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

What is claimed is:

1. In a device of the kind described, the combination with a pipe and a valve controlling the flow of liquid through said pipe; of means for controlling said valve comprising a spring, a lever connected at one end to said spring, a fulcrum block slidable longitudinally of said lever, a gage arm operatively connected with said fulcrum block to coördinate the positions of the fulcrum and gage arm, and a connection between said lever and valve.

2. In a device of the kind described, the combination with a pipe and a valve controlling said valve comprising a Bourdon tube leaving one end fixedly connected to the pipe, a lever having one end connected to the remaining end of the tube, a movable fulcrum for said lever, and an operative connection between said lever and valve.

3. In a device of the kind described, the combination with a pipe and a valve controlling the flow of fluid through the pipe; of means for controlling said valve comprising a Bourdon tube leaving one end fixedly connected to the pipe, a lever having one end connected to the remaining end of the tube, a movable fulcrum for said lever, an indicator arm, an operative connection between said arm and fulcrum, and a link connecting said lever and valve.

4. In a device of the kind described, the combination with a pipe having an inlet at one end, an outlet at the other end and a second outlet between the inlet and outlet; of a valve in said pipe and arranged to selectively close communication between said inlet and the outlets, a Bourdon tube having one end fixedly connected with the pipe and communicating with the first outlet, a lever having one end fixedly connected to the remaining end of the Bourdon tube, a fulcrum adjustable longitudinally of said lever, an indicator arm connected with the fulcrum to adjust the same, and a link connecting the lever and valve.

5. In a device of the kind described, the combination with a pipe having an inlet at one end, an outlet at the other end and a second outlet between the inlet and outlet; of a valve in said pipe and arranged to selectively close communication between said inlet and the outlets, a Bourdon tube having one end fixedly connected with the pipe and communicating with the first outlet, a lever having one end fixedly connected to the remaining end of the Bourdon tube, a fulcrum adjustable longitudinally of said lever, a lever having one end pivoted in fixed relation to the pipe and its other end connected to the fulcrum, a sliding rack bar having connection with said lever, an indicator arm, and a gear carried by the indicator arm and meshing with the rack bar.

In testimony whereof, I affix my signature, in the presence of two witnesses.

GIBSON C. SMITH.

Witnesses:
J. E. SCHELL, Jr.
J. C. DIFFENDAL.